(12) United States Patent
Higashiyama et al.

(10) Patent No.: US 6,591,064 B2
(45) Date of Patent: Jul. 8, 2003

(54) IRIS PICKUP APPARATUS (75) Inventors: Seiji Higashiyama, Zama (JP); Ken Ikoma, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/199,682

(22) Filed: Jul. 19, 2002

(65) Prior Publication Data

US 2003/0021598 A1 Jan. 30, 2003

(30) Foreign Application Priority Data

Jul. 24, 2001 (JP) .......................................... 2001-223139

(51) Int. Cl.[7] .............................................. G03B 17/02
(52) U.S. Cl. ......................... 396/18; 396/427; 382/117; 348/78; 348/143
(58) Field of Search .......................... 348/78, 143, 373; 382/117; 396/18, 336, 427

(56) References Cited

U.S. PATENT DOCUMENTS 5,717,512 A * 2/1998 Chmielewski et al. ...... 359/210
6,320,610 B1 * 11/2001 Van Sant et al. ........... 348/143

FOREIGN PATENT DOCUMENTS

JP        2000-23946        1/2000

* cited by examiner

*Primary Examiner*—David Gray
(74) *Attorney, Agent, or Firm*—Pearne & Gordon LLP (57) ABSTRACT

An iris pickup apparatus includes: a wide-angle camera for picking up the image of a photographic object, a telephotograph camera for picking up the enlarged image of an iris of a photographic object by focusing the lens of the camera on the iris of the photographic object, a panning mechanism for panning the telephotograph camera, and a tilt mechanism for pivotally tilting the wide-angle camera and the telephotograph camera. The wide-angle camera and the telephotograph camera are arranged so that their optical axes cross each other at right angles. The tilt mechanism operates to pivotally tilt the wide-angle camera and the telephotograph camera on the same plane as the optical axis plane.

8 Claims, 9 Drawing Sheets

IRIS PICKUP APPARATUS

BACKGROUND OF THE INVENTION

The present invention relates to an iris recognition system as one of the personal identification systems and particularly to an iris pickup apparatus using a wide-angle and a telephotograph camera for obtaining an iris image.

There is a known system of making personal identification by the use of an iris pattern as one of the personal identification systems for security. Unlike fingerprints, the iris recognition has the advantage that it is only needed to pick up an iris image with a separated camera in non-contact condition and that the misidentification percentage is extremely low but the recognition accuracy is high, so that the spread of the iris recognition is greatly expected in future. On the other hand, the use of such an iris image is restricted by the fact that the iris image has to be clear and picked up quickly during the time an object of recognition is at a standstill.

As an iris pickup system meeting the above restrictions, there is a known iris pickup apparatus using two kinds of cameras including a wide-angle camera and a narrow-angle camera as described in Japanese Patent Publication No. 2000-23946, for example.

The iris pickup apparatus is so arranged as to operate through the steps of recognizing a face image by pattern matching out of images of persons as photographic objects picked up by the wide-angle camera, determining the position of the right or left eye from the face image, directing the narrow-angle camera as a telephotograph camera toward the iris and accurately focusing the lens of the camera on the iris by the use of the autofocusing technique.

The above iris pickup apparatus will now be specifically described by reference to the drawings.

Figure 9:
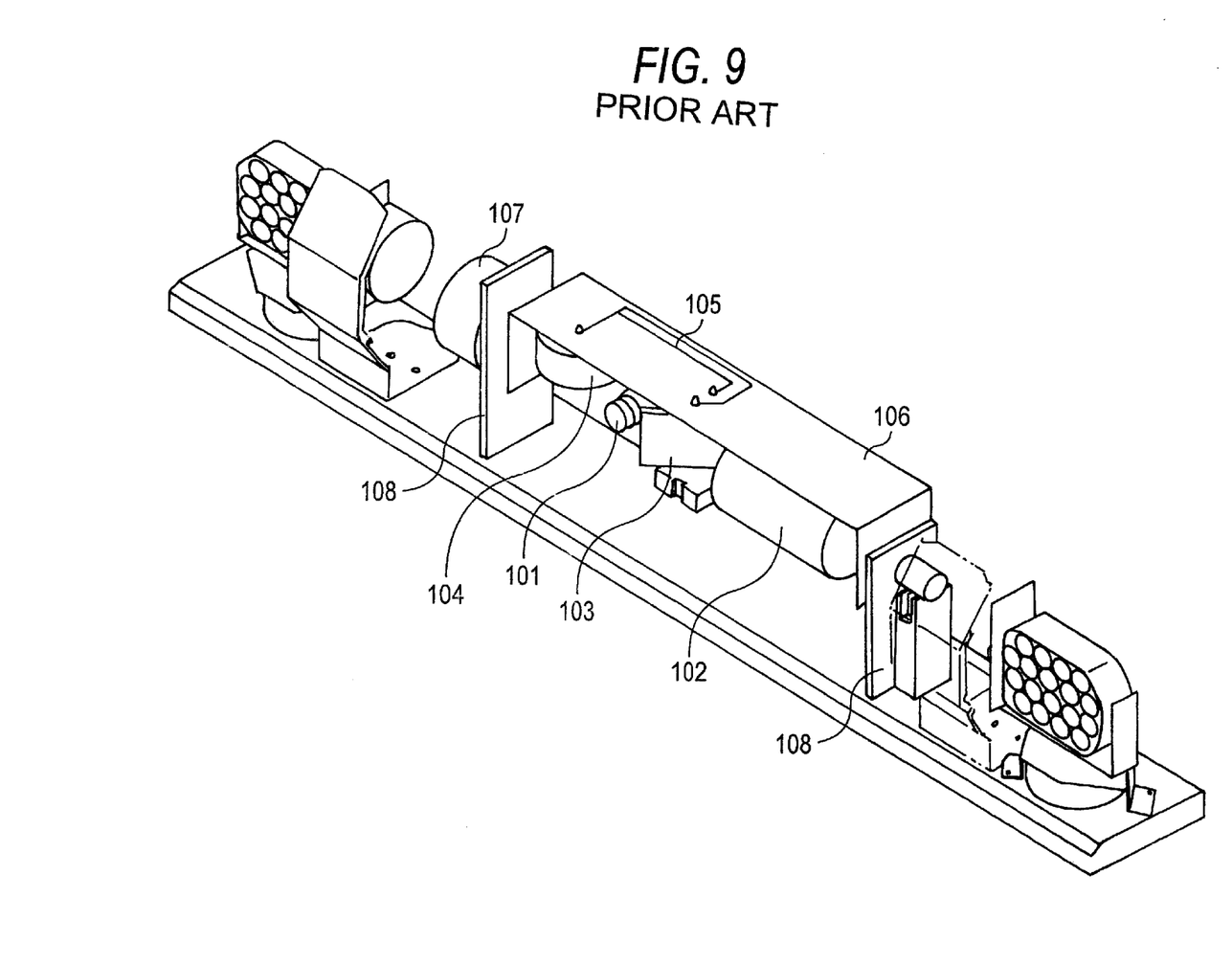
FIG. 9 is a perspective view of a conventional iris pickup apparatus.

FIG. 9 is an external perspective view of the cameral unit of a conventional iris recognition apparatus. The camera unit has a wide-angle camera 101, a telephotograph camera 102, a mirror 103 for directing an optical axis to the front as the telephotograph camera 102 is turned sideways, a panning motor 104 for panning the mirror 103, a link 105 for transmitting the torque of the panning motor 104, a tilt table 106 for holding the link 105, a tilt motor 107 for turning the tilt table 106, and a support tables 108 for holding the tilt table 106 and the tilt motor 107.

In the iris pickup apparatus having the camera unit thus arranged, the face of a person is picked up by pivotally tilting the tilt table 106 by means of the tilt motor 107 so that the whole person's face as a photographic object is picked up by the wide-angle camera 101. Then the position of the right or left eye of the person's face is determined from the image thus picked up. Further, the tilt table 106 is pivotally tilting so as to set the optical axis of the telephotograph camera 102 to the eye position thus determined and the mirror 103 is pivotally panned by the panning motor 104. When the eye position is reached, an iris image is picked up by focusing the lens of the camera on the iris by the use of the autofocusing technique.

However, since the wide-angle camera 101 and the telephotograph camera 102 are disposed horizontally along the tilt pivot shaft in the above iris pickup apparatus, the optical axes of the cameras fails to coincide with each other and this causes a parallax between the cameras to occur. Consequently, it has been needed to adjust the direction of each camera so that the optical axes of the wide-angle camera 101 and the telephotograph camera 102 cross each other to provide the same imaging position after various parts are assembled.

SUMMARY OF THE INVENTION

It is therefore an object of the invention made in view of the above situation to provide an iris pickup apparatus easy to operate without requiring troublesome adjustment of the directions of a wide-angle camera and a telephotograph camera.

Firstly, an iris pickup apparatus according to the invention comprises a first camera for picking up the image of a photographic object, a second camera for picking up the iris of the photographic object, a panning mechanism for panning the second camera, and a tilt mechanism for pivotally tilting the first camera and the second camera, wherein the tilt mechanism is so arranged as to pivotally tilt the first camera and the second camera on the same plane as the optical axis planes of these cameras.

Thus, the optical axis of the first camera and the optical axis of the second camera are caused to coincide with each other when an image is picked up thereby.

Secondly, the tilt mechanism includes a tilt stand for holding the first camera, the second camera and a panning motor, a tilt motor for pivotally tilting the tilt stand, and support tables for holding the tilt stand and the tilt motor.

Thus, the first camera and the second camera both can be made to perform a tilt operation.

Thirdly, the panning mechanism is so arranged as to pivot the first camera and the second camera on a panning shaft perpendicular to a tilt shaft for pivotally tilting the first camera and the second camera.

Fourthly, cleaning brushes for cleaning the lenses of the respective first and second cameras are preferably provided on the pivotal orbits of these lenses when the first camera and the second camera are pivotally tilted.

As the cleaning of the lens of each camera can be done simultaneously with the iris recognizing operation, the lenses are always kept clean. Moreover, a clear image without blurs and dust trances becomes available, whereby lens maintenance work need not be done very often.

DETAILED DESCRIPTION OF THE PREFERRED EMBODIMENT

A detailed description will now be given of embodiments of the invention by reference to the accompanying drawings.

[Embodiment 1]

Figure 1:
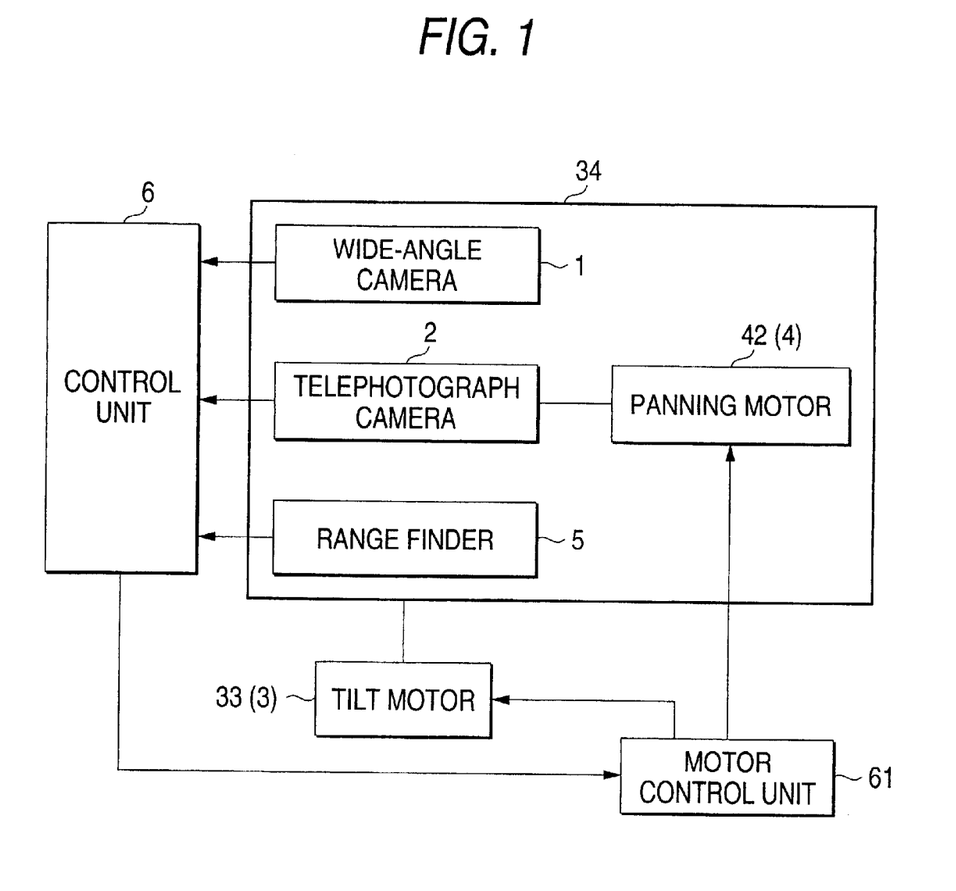
FIG. 1 is a block diagram showing an electrical arrangement of an iris pickup apparatus according to a first embodiment of the invention.

FIG. 1 shows an iris pickup apparatus as a first embodiment of the invention, including a wide-angle camera (first camera) 1, a telephotograph camera (second camera) 2, a tilt mechanism 3, a panning mechanism 4, a range finder 5 and a control unit 6.

The wide-angle camera 1 is mainly used for picking up the whole face of a person to be identified/authenticated, the person standing in front of the wide-angle camera. On the other hand, the telephotograph camera 2 is used for picking up the iris of the right or left eye of a person to be identified/authenticated by accurately focusing the lens of the camera on the iris of the eye picked up by the wide-angle camera 1. In this case, the telephotograph camera 2 is equipped with an autofocusing mechanism (not shown).

Figure 2:
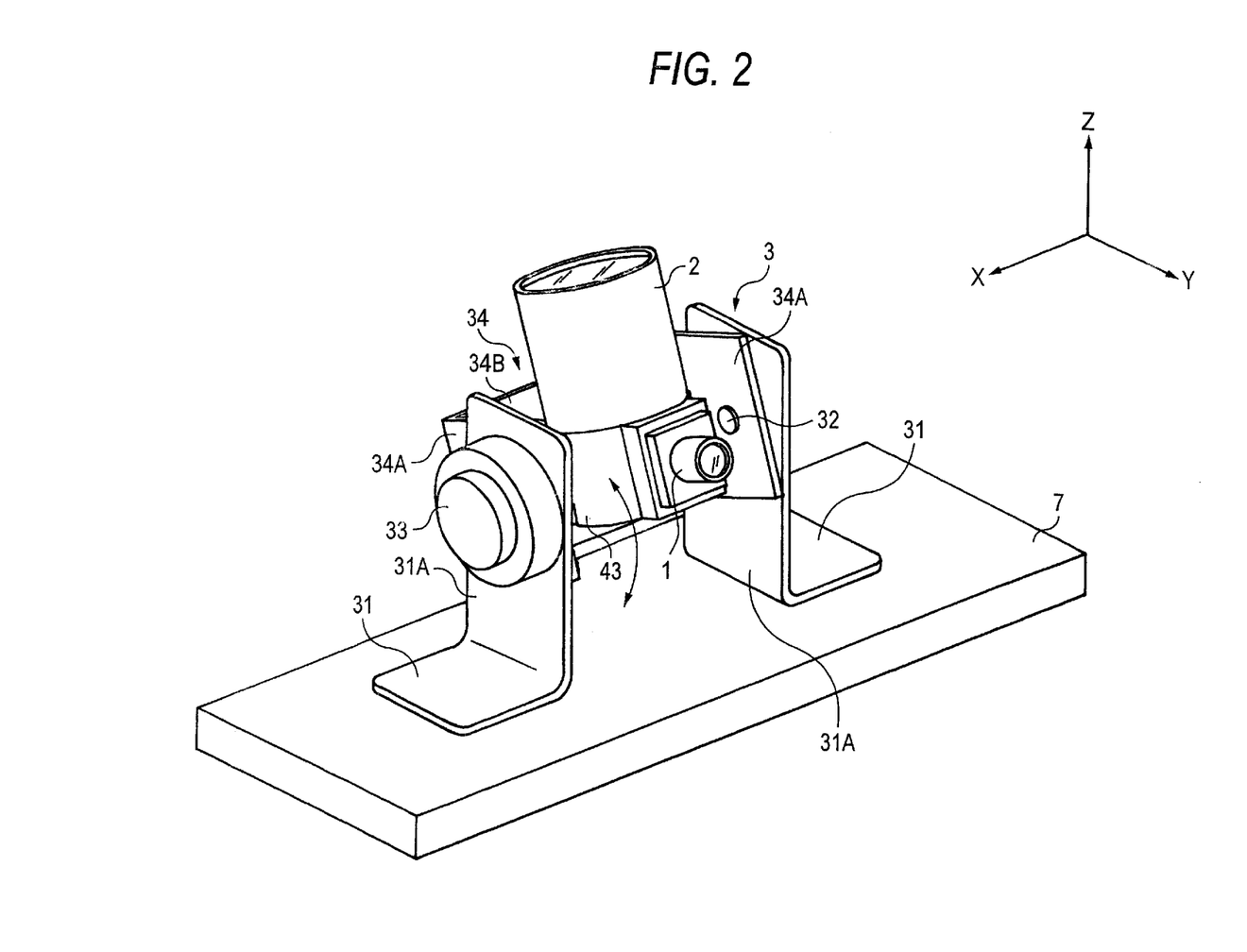
FIG. 2 is a diagram explanatory of the operation of the iris pickup apparatus shown in FIG. 1.

As shown in FIG. 2, the tilt mechanism 3 is so arranged as to adjust the operating positions of the wide-angle cameras 1 and the telephotograph camera 2 in the direction of the face and eyes of a person by pivoting these cameras vertically on a first shaft 32, which will be described below. As also shown in FIG. 2, the tilt mechanism 3 has a pair of support members 31 fixed to a base plate 7, the first shaft 32 pivotably provided between the support members 31, a tilt motor 33 for pivoting the first shaft 32, and a tilt stand 34 pivotably provided to the support members 31 (via the first shaft 32).

The first shaft 32 is fitted vertically to the upright sides 31A of the support members 31 and set parallel to the X-axis. The driving operation of the tilt motor 33 is controlled by a motor control unit 61 shown in FIG. 1. The input terminal of the motor control unit 61 is connected to the output terminal of the control unit 6.

Figure 3:
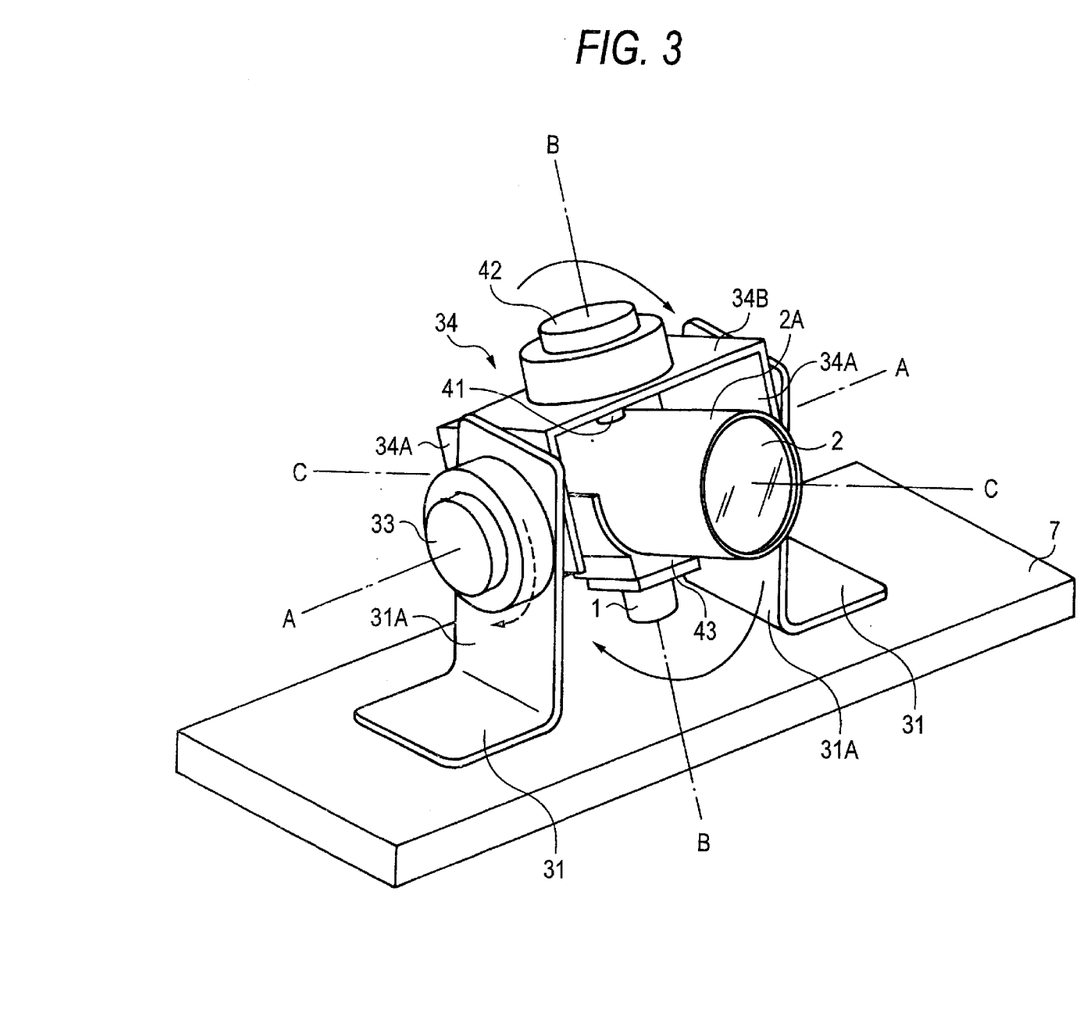
FIG. 3 is a diagram explanatory of the operation of the iris pickup apparatus shown in FIG. 1.

As shown in FIGS. 2 and 3, on the other hand, the tilt stand 34 is substantially horseshoe-shaped and both sides 34A of the tilt stand 34 are pivoted along the upright sides 31A of the respective support members 31. The telephotograph camera 2 and the wide-angle camera 1 are pivotably fitted to the tilt stand 34 via a second shaft (perpendicular to the first shaft) as will be described later.

Further, the panning mechanism 4 is so arranged as to adjust the operating positions of the wide-angle camera 1 and the telephotograph camera 2 in the direction of the face and eyes of a person by pivoting these cameras horizontally on a second shaft 41, which will be described below. As shown in FIG. 3, the panning mechanism 4 has the second shaft 41 pivotably fitted to the tilt stand 34 of the tilt mechanism 3, a panning motor 42 for pivoting the second shaft 41 and a frame member 43 that pivots integrally with the second shaft 41 via a telephotograph lens 2.

Figure 4:
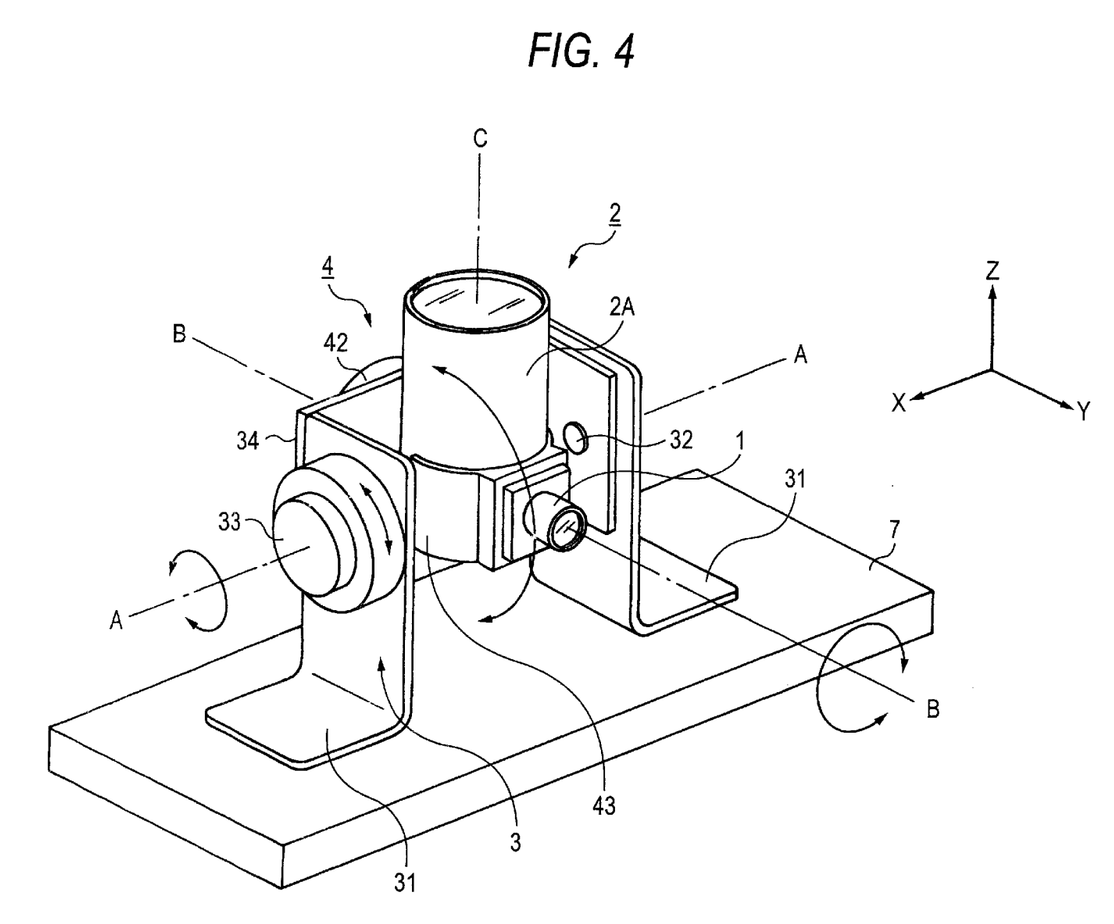
FIG. 4 is a diagram explanatory of the first half operation of the iris pickup operation of the iris pickup apparatus shown in FIG. 1.

The second shaft 41 is fitted vertically to the surface of the center plate of the tilt stand 34 and its axis B is, as shown in FIG. 4, set perpendicular to the axis A of the first shaft 32. Moreover, the lens barrel 2A of the telephotograph lens 2 is fixed to the second shaft 41, so that the axis B of the second shaft 41 and the axis A of the first shaft 32 cross the optical axis of the telephotograph lens 2 at right angles.

In this case, the driving operation of the panning motor 42 is controlled by the motor control unit 61 of FIG. 1.

As shown in FIG. 3, a wide-angle lens 1 is fixed to the frame member 43, so that the axis B of the second shaft 41 and the optical axis of the wide-angle lens 1 coincide with each other. Therefore, the optical axis (equivalent to B) of the lens of the wide-angle camera 1 and the optical axis (equivalent to C) of the lens of the telephotograph camera 2 cross each other at right angles.

The control unit 6 is such that its input is connected to the outputs of the wide-angle camera 1, the telephotograph camera 2 and the range finder and that its output is connected to the output of the motor control unit 61, whereby the driving operation of the tilt motor 33 and the panning motor 42 is controlled via the motor control unit 61 according to data from the wide-angle camera 1, the telephotograph camera 2 and the range finder 5.

The operation of the iris pickup apparatus according to this embodiment of the invention will subsequently be described.

(1) In the state of FIG. 2, first, the iris pickup apparatus waits for a photographic object to enter a predetermined range of the forepart thereof. While the iris pickup apparatus is on standby, the wide-angle camera 1 looks to the right forward position as a default one.

While on standby, the range finder 5 (not shown in FIG. 1) is caused to emit infrared light always or at predetermined intervals of time, so that the control unit 6 decides the presence of a photographic object depending on whether the reflected light exists or not. When the photographic object enters the predetermined range of the forepart of the apparatus, the distance between the reflected light and the photographic object is measured by the range finder 5.

(2) When the presence of the photographic object is confirmed, the wide-angle camera 1 performs the imaging operation. Then the control unit 6 decides whether the face of the photographic object is shown in a picked-up image through the pattern matching process during the operation of picking up the photographic object. When no face is decided to be existent, the control unit 6 sends a tilt signal to the tilt motor 33 via the motor control unit 61 to have a tilt operation performed in order to take in the picked-up image while the wide-angle camera 1 is vertically pivoted. The above operation is repeated until the whole face image is taken in.

(3) In case where a face pattern is shown within the image picked up by the wide-angle camera 1, the tilt mechanism 3 of the tilt stand 34 performs the tilt operation under the control of the control unit 6 by means of its signal therefrom so that the face is placed in the center position of the image picked up by the wide-angle camera 1. Moreover, the panning mechanism 4 performs a panning operation under the control of the control unit 6 by means of its signal therefrom so that the face of the photographic object is placed vertically in the center position. Then the position of the right or left eye is detected from the image. The distance to the iris of the detected eye is then measured by the range finder.

(4) Subsequently, the position of and distance up to the iris are preset in the telephotograph camera 2 and the tilt mechanism is operated by the control unit 6 according to the data, whereby as shown in FIG. 3 the wide-angle camera 1 and the tilt stand 34 fitted thereto are pivoted downward. Then the telephotograph camera 2 is moved out up to a preset position and set in the direction of the center of the face of the photographic object. Although the preset position needs some correction because of the parallax between the cameras in the conventional iris pickup apparatus, an arrangement like this is unnecessary in the iris pickup apparatus according to the invention as the optical axes of the wide-angle camera 1 and the telephotograph camera 2 are disposed in parallel on the same plane perpendicularly crossing the tilt rotating shaft A.

Figure 5:
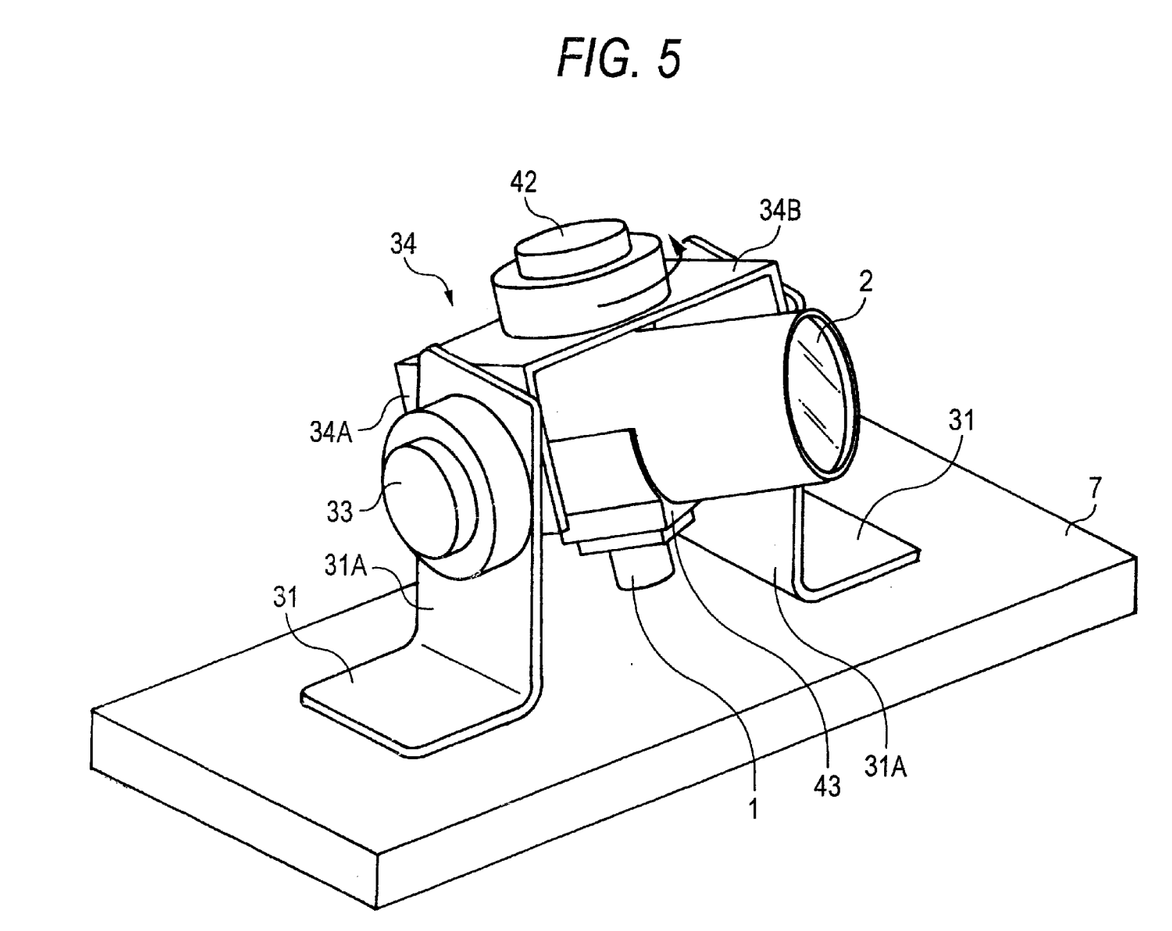
FIG. 5 is a diagram explanatory of the second half operation of the iris pickup operation of the iris pickup apparatus shown in FIG. 1.

(5) Subsequently, the operation of panning the telephotograph camera 2 is performed by the panning mechanism 4 under the control of the control unit 6 and as shown in FIG. 5 the telephotograph camera 2 is horizontally pivoted so as to place the right or left eye of the face of the photographic object in the substantially center position (on the optical axis of a focus lens (not shown)) of the picked-up image. Moreover, the a focus-lens driving mechanism (not shown) is quickly driven by the control unit 6 so that the focus lens is focused on the distance and the focus lens is focused on the iris through the normal autofocusing (AF) operation.

Therefore, the image picked up in this condition needs no correction and is directly usable as the iris image intended for authentification.

According to the first embodiment of the invention, by disposing the optical axes of the wide-angle camera 1 and the telephotograph camera in parallel on the same plane perpendicularly crossing the tilt rotating shaft, any adjustment at the time of assembly and any correction during the operation of picking up the iris can be dispensed with while the parallax between the cameras is obviated. Unlike the conventional iris pickup apparatus, the iris pickup apparatus according to the first embodiment of the invention does not require any correction of the parallax when the iris image is picked up and this makes unnecessary troublesome positional adjustment of each camera when the component parts are incorporated into the apparatus, thus improving the efficiency of assembly work.

[Embodiment 2]

A second embodiment of the invention will now be described by reference to FIGS. 6 to 8.

In this embodiment of the invention, the same component parts as the first embodiment is designated by same reference numerals in the first embodiment to omit the same description thereof.

Figure 6:
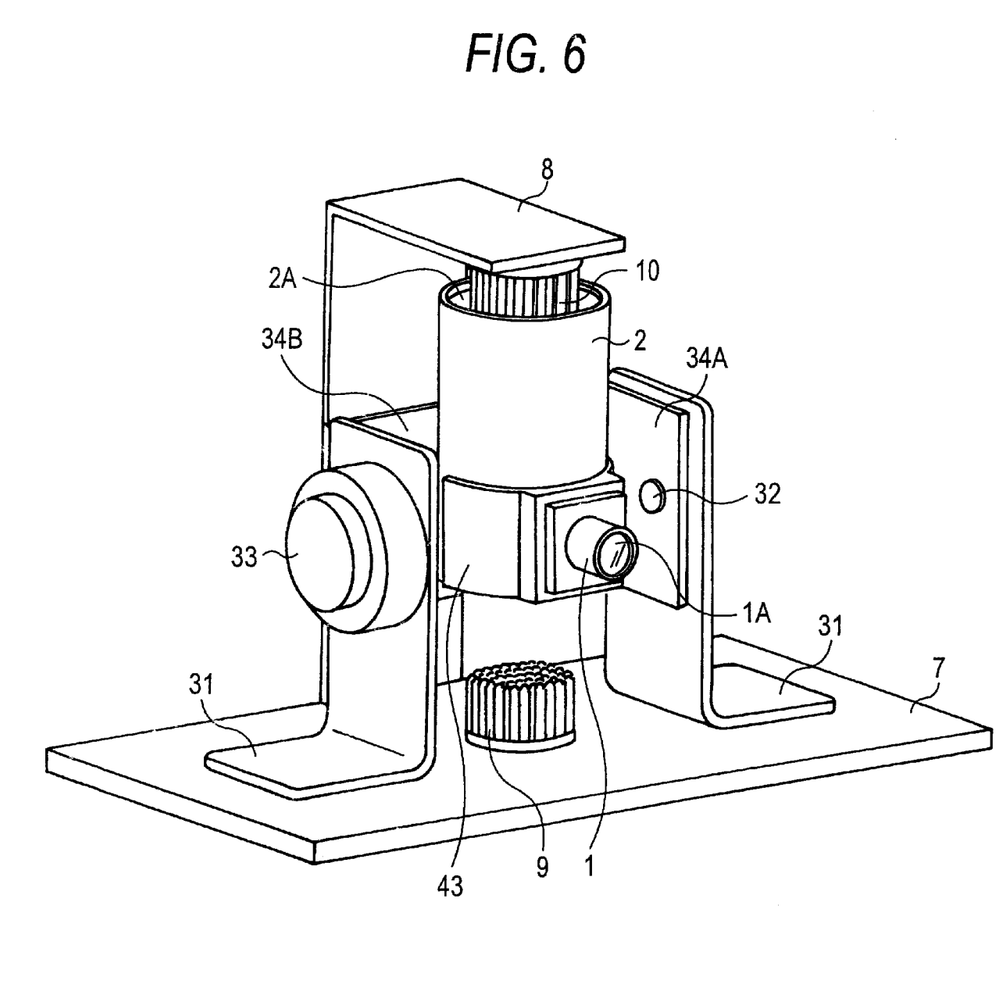
FIG. 6 is a perspective view showing an arrangement of an iris pickup apparatus according to a second embodiment of the invention.

As shown in FIG. 6, an iris pickup apparatus according to this embodiment of the invention differs from the iris pickup apparatus shown in the first embodiment of the invention shown in FIG. 4 in that a first cleaning brush 9 is provided for the wide-angle lens 1A of the wide-angle camera 1 and that a second cleaning brush 10 is provided for the telephotograph lens 2A of the telephotograph camera 2.

Figure 7:
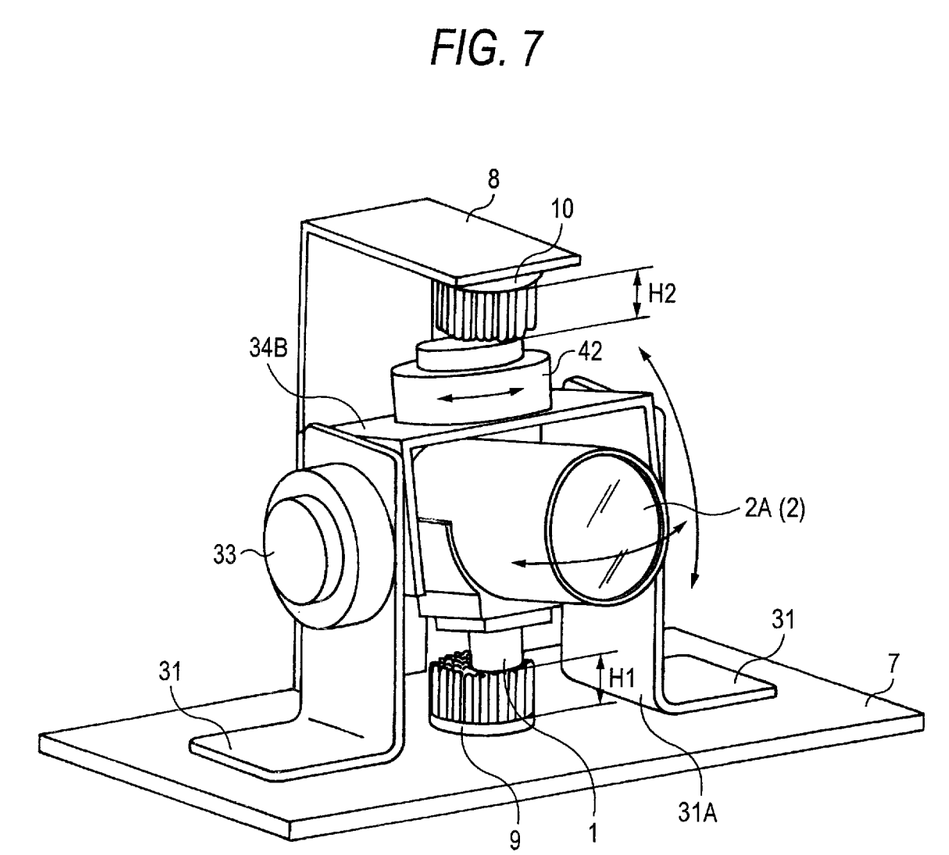
FIG. 7 is a diagram showing the function of cleaning a wide-angle lens in the iris pickup apparatus of FIG. 6.

As shown in FIG. 7, cleaning is done by operating the tilt mechanism and the panning mechanism in such a condition that the front end side of the first cleaning brush 9 is kept in contact with the face (see FIG. 8) of the wide-angle lens 1A of the wide-angle camera 1; in other words, the cleaning is done by pivoting not the brush side 9 but the lens side.

The cleaning brush 9 according to this embodiment of the invention is fitted onto the floor surface of the base plate and the pivotal orbit of the telephotograph lens 2A in order to prevent the photographing of the object from being badly affected. The cleaning brush 9 for use in this case is to have suitable length (height of H1) in consideration of the distance to the lens surface.

Figure 8:
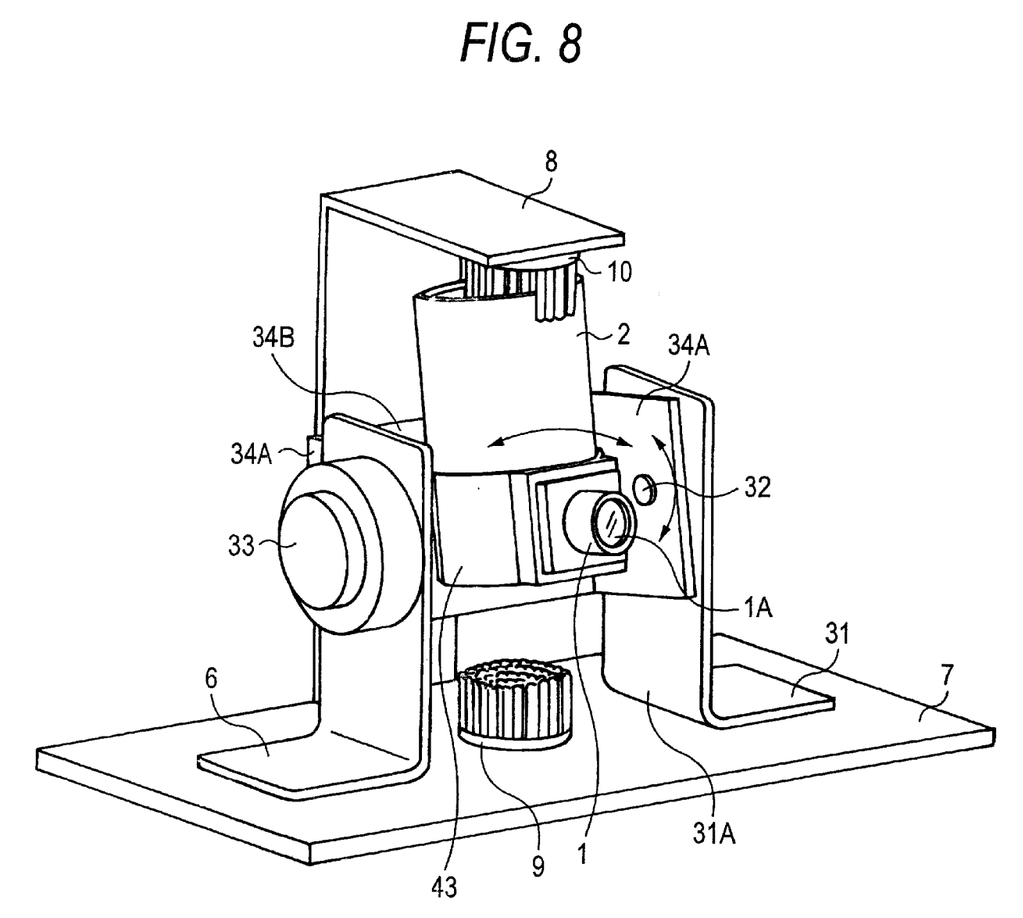
FIG. 8 is a diagram showing the function of cleaning a telephotograph lens in the iris pickup apparatus of FIG. 6.

As shown in FIG. 8, on the other hand, cleaning is also done by operating the tilt mechanism and the panning mechanism in such a condition that the front end side of the second cleaning brush 10 is kept in contact with the face (see FIG. 7) of the telephotograph lens 2A of the telephotograph camera 2.

The cleaning brush 10 according to this embodiment of the invention is fitted onto the ceiling face of a bracket 8 uprighted on the rear portion side opposite to the direction of picking up the image and the pivotal orbit of the wide-angle lens 1A in order to prevent the photographing of the object from being badly affected. The cleaning brush 10 for use in this case is to have suitable length (height of H2) in consideration of the distance to the lens surface.

Therefore, in comparison with the conventional iris pickup apparatus, the iris pickup apparatus according to the second embodiment of the invention allows a clear image to be picked up over a long period of time, whereby maintainability is improved as maintenance work need not be done frequently.

As set forth above, the iris pickup apparatus according to the invention includes the first camera for picking up the image of a photographic object, the second camera for picking up the enlarged image of the iris of the photographic object by focusing the camera on the iris thereof, the panning motor for panning the second camera, the tilt stand for holding the first camera and the second camera and the panning motor, the tilt motor for pivotally tilting the tilt stand, and the two support tables for holding the tilt stand and the tilt motor. Moreover, the second camera and the first camera are disposed so that the optical axes of these cameras cross each other perpendicularly and arranged so as to be pivotally tilted on the same plane as the optical axis plane.

Therefore, it is possible to prevent the generation of the parallax between the first camera and the second camera, whereby an iris pickup apparatus easy to operate can be materialized as the direction of each camera need not be adjusted.

What is claimed is:

1. An iris pickup apparatus comprising:

a first camera for picking up the image of a photographic object;

a second camera for picking up the iris of the photographic object;

a panning mechanism for panning the second camera; and a tilt mechanism for pivotally tilting the first camera and the second camera on the same plane as the optical axis planes of the first camera and the second camera.

2. The iris pickup apparatus as claimed in claim 1, wherein the tilt mechanism includes:

a tilt stand for holding the first camera, the second camera and a panning motor;

a tilt motor for pivotally tilting the tilt stand; and a support table for holding the tilt stand and the tilt motor.

3. The iris pickup apparatus as claimed in claim 1, wherein the panning mechanism is arranged to pivot the first camera and the second camera on a panning shaft perpendicular to a tilt shaft for pivotally tilting the first camera and the second camera.

4. The iris pickup apparatus as claimed in claim 1, further comprising cleaning brushes provided on a pivotal orbits of these lenses to clean lenses of the respective first and second cameras when the first camera and the second camera are pivotally tilted.

5. The iris pickup apparatus as claimed in claim 1, wherein the optical axis of the first camera and the optical axis of the second camera cross each other at right angles.

6. The iris pickup apparatus as claimed in claim 1, further comprising a controller which detects the position of the eye of the photographic object based on the image picked up by the first camera, and which controls the second camera to pivoting toward the position of the eye of the photographic object and to pick up the iris of the photographic object.

7. The iris pickup apparatus as claimed in claim 6, further comprising a range finder which measures a distance to the iris of the photographic object and transmits a data of the distance to the controller, wherein the controller controls the second camera to pick up the iris of the photographic object based on the data of the distance.

8. The iris pickup apparatus as claimed in claim 1, wherein the first camera is a wide-angle camera, and the second camera is a telephotograph camera.

* * * * *